(No Model.)

C. S. PINE.
MANUFACTURE OF LOCKETS.

No. 277,339. Patented May 8, 1883.

WITNESSES:
Joseph A. Miller Jr
Wm. L. Cox

INVENTOR:
Charles S. Pine
by Joseph A. Miller atty

UNITED STATES PATENT OFFICE.

CHARLES S. PINE, OF PROVIDENCE, RHODE ISLAND.

MANUFACTURE OF LOCKETS.

SPECIFICATION forming part of Letters Patent No. 277,339, dated May 8, 1883.

Application filed February 5, 1881. (No model.)

*To all whom it may concern:*

Be it known that I, CHARLES S. PINE, of Providence, in the county of Providence and State of Rhode Island, have invented a new and useful Improvement in Lockets; and I hereby declare that the following is a full, clear, and exact description of the same, reference being had to the accompanying drawings, forming part of this specification.

The object of this invention is to construct three-part lockets of stock-plate in such a manner that the edge of the plate shall at no point be presented to view.

The invention consists in constructing the three parts of the lockets described out of stamped stock-plate, the inner surface of which is trimmed, and uniting the parts by subjecting them to sufficient heat to melt the tin while the joints are held tightly together, as will be more fully set forth hereinafter.

Figure 1:
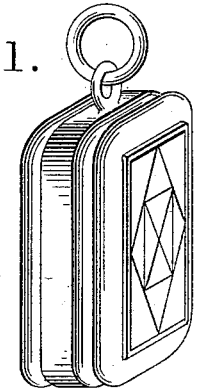
Figure 2:
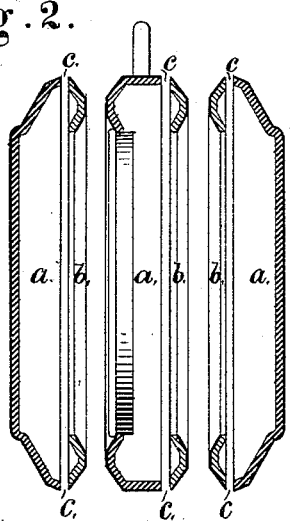
Figure 3:
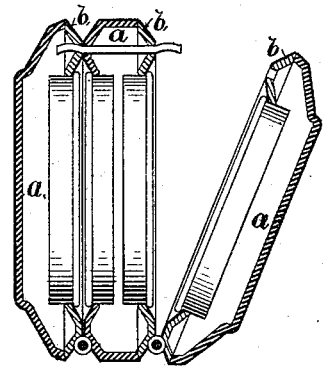
Figure 4:
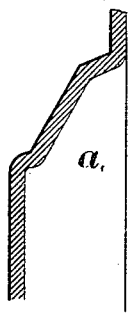
Figure 5:
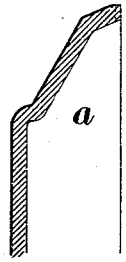
Figure 6:
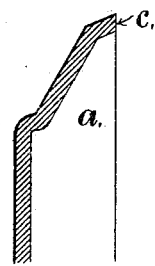

Figure 1 is a perspective view of a three-part locket. Fig. 2 represents the parts forming the locket before they are soldered together. Fig. 3 represents the parts soldered together, hinged, and provided with the snap by which they are held closed. Fig. 4 represents a part of the locket forming the outer cover as first stamped. Fig. 5 represents the same part after it has passed through the shearing-die, and Fig. 6 after the joint has been ground.

In stock-plate only one side of the metal is fine gold. The edge will, therefore, show the inferior metal, and lockets made of such stock-plate can be readily recognized and will soon discolor at the edges.

The parts *a* and *b* in solid gold lockets are secured together by making *b* sufficiently smaller so as to solder it within the part *a*. To make the same quality of stock-plate, I make the two parts of the same size and grind the joints *c c* perfectly true. The stock-plate before stamping I coat with tin, and when I now wire the parts *a* and *b* together and subject them to heat the tin on the inside melts, and, by properly turning, solders the two parts firmly together. When now the whole is polished no seam or joint is visible, and the edges of the stock-plate are covered, so that only the pure gold is in sight, thus making a locket as fine in appearance, that will stand all the gold tests, and is stronger and cheaper than a gold locket.

Having thus described my invention, I claim as new and desire to secure by Letters Patent—

1. The improvement in the art of manufacturing lockets, the same consisting in tinning the inner surface of the stamped plates forming the locket, securing the parts together, and subjecting the same to sufficient heat to melt the tin and firmly unite the same, as described.

2. The improvement in the art of making lockets, the same consisting in coating the plate with tin, stamping the tinned plate, binding the parts together, and subjecting the whole to heat to melt the tin and solder the parts together, as described.

In witness whereof I have hereunto affixed my name.

CHAS. S. PINE.

Witnesses:
J. A. MILLER, Jr.,
WM. L. COOP.